Figure 1:
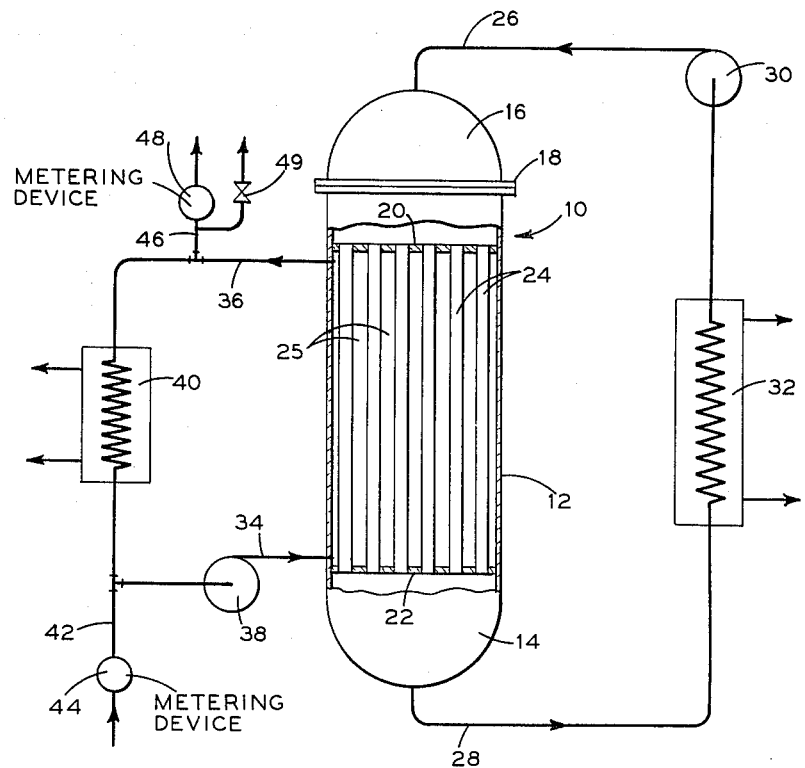

*INVENTORS*
ROBERT W. CARLSON
JOHN W. RYON
DONALD C. SCHLUDERBERG

ATTORNEY

United States Patent Office 3,247,074
Patented Apr. 19, 1966

3,247,074
STEAM COOLED REACTOR ARRANGEMENT
Donald C. Schluderberg, John W. Ryon, and Robert W. Carlson, Lynchburg, Va., assignors to The Babcock & Wilcox Company, New York, N.Y., a corporation of New Jersey
Filed June 18, 1963, Ser. No. 288,666
7 Claims. (Cl. 176—42)

The present invention relates in general to a nuclear reactor and more particularly to a nuclear reactor wherein a hydrogen-bearing vapor is used to variably moderate and control the chain reaction.

In every nuclear reactor a quantity of fissionable material must be arranged as a core with sufficient mass and the proper configuration so it will undergo a self-sustaining fission-type chain reaction. Further, in a non-breeder type of reactor, it is necessary to provide fissionable material in the core in excess of that required to achieve the chain reaction in order to continue operation to compensate for the consumption of the fissionable material, or fuel, and the accumulation of neutron absorbing poison materials resulting from the fission process. This excess fuel generates a greater number of neutrons than required to maintain the self-sustaining fission-type chain reaction, and it is thus necessary to control these excess neutrons either by absorbing them or by permitting them to escape from the reactor without further promoting the chain reaction.

Control of these excess neutrons is carried out in reactors of the prior art by introducing into the cores thereof a neutron poison material, i.e., a material which absorbs neutrons without reproducing them. This method includes the use of movable control rods formed of a poison material such as hafnium or boron, or the use of a specified amount of such poison material which is placed permanently in the core or mixed with the reactor coolant.

Furthermore, the fissioning of the atoms which creates the chain reaction generates fast neutrons having a wide range of high velocities. It is known that for most reactors now contemplated the chain reaction is best promoted by the slower, or thermal, neutrons rather than by the fast neutrons. The thermal neutrons have a greater tendency to cause a fissionable atom to fission while the fast neutrons tend to completely escape from the core. Thus it has been found that it is necessary to moderate, or slow, the neutrons generated by the chain reaction so as to increase the number of thermal neutrons available to sustain the chain reaction. Prior art reactors have generally utilized moderating material such as graphite, beryllium oxide, heavy or ordinary water in the core to provide this moderation.

In most of the reactors of the prior art it has been necessary to combine the above methods of controlling the chain reaction. Thus, it has been necessary to provide movable control rods within the reactor with the associated mechanical equipment necessary to move them. They have been required primarily for regulation, shim and safety (scram) control to assure a safe, reliable method of starting, operating and shutting down the reactor. These control rods increase the cost and complexity of a reactor due to the mechanical components in the control rod drives. Furthermore, they create within the reactor core undesirable flux peaking due, in part, to the poison material in the control rod being movably positioned within the path of neutrons generated during the chain reaction, with resultant peaks in the temperature and the heat flux of the reactor core. Accordingly, reactors of the prior art are of necessity designed so that the maximum fuel clad surface temperature reached within the core, as a result of neutron flux peaking, is maintained within safe limits, with resultant lowering of the average operating temperature in the core as compared to the permissible temperatures if no such flux peaking occurred.

It is known that if the degree of such flux peaking were minimized the average temperature and heat flux of the reactor core could be safely raised, with consequent increase in power output for the same final temperature with improved cycle efficiencies.

The present invention discloses a reactor which may be variably controlled and moderated wherein a plurality of fissionable material-bearing fuel elements are arranged as a core to undergo a self-sustaining fission-type chain reaction by introducing a single phase hydrogen-isotope-bearing moderating fluid capable of a substantial change in density with a change in enthalpy into the core, and regulating this reaction by varying the concentration of the moderating fluid within the core and/or varying the mixture of fluids having different moderating power.

Accordingly, the present invention provides a nuclear reactor comprising a pressure vessel divided into at least two sections including a first section disposed substantially centrally of the pressure vessel. A second section extends through the first section but is separate and distinct therefrom. A plurality of fissionable material-bearing fuel elements are arranged in the second section as a core to undergo a self-sustaining fission-type chain reaction. A means is provided for introducing a coolant fluid through the second section in heat transfer relationship with the fuel elements therein to remove the heat generated by the chain reaction. A means is also provided for introducing a moderating fluid into the first section about the fuel elements in the second section to moderate the chain reaction.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which we have illustrated and described a preferred embodiment of the invention.

Figure 2:
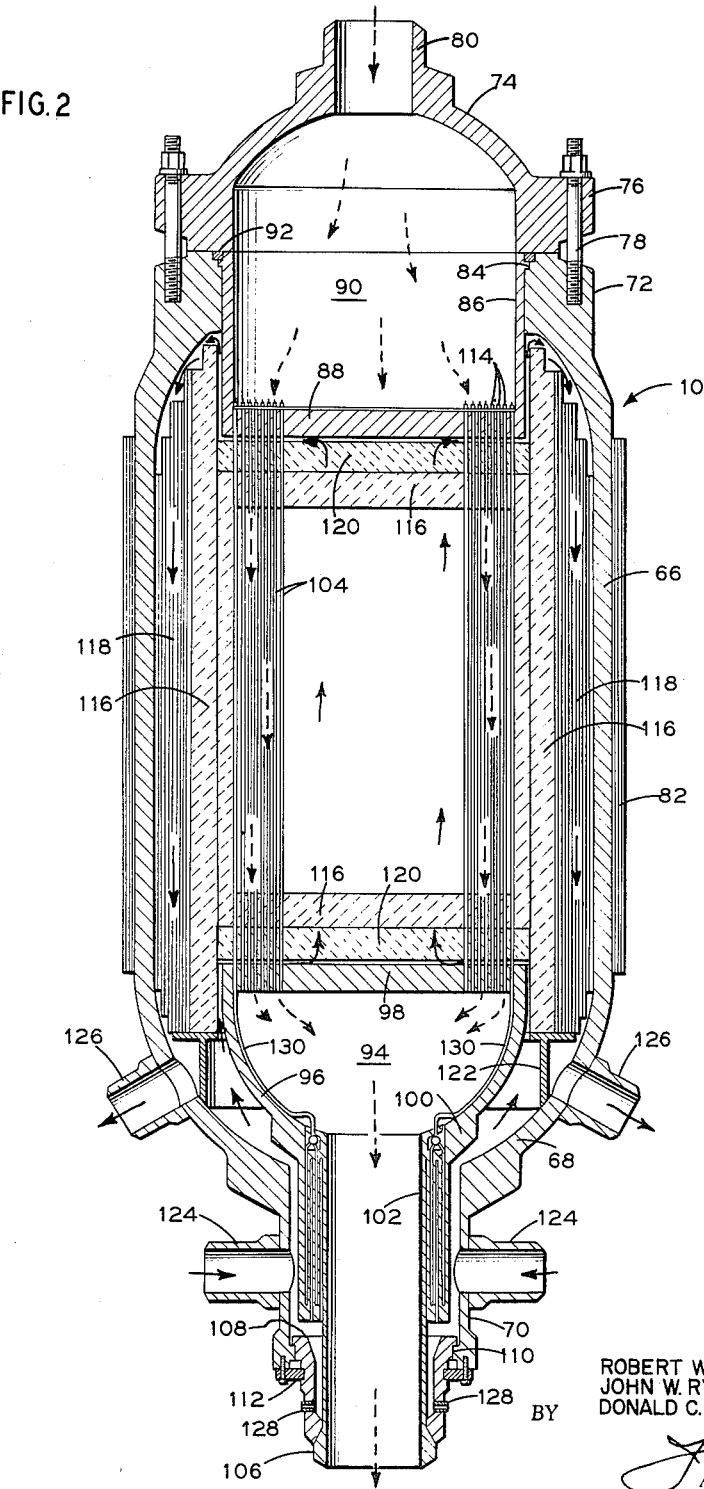
Figure 3:
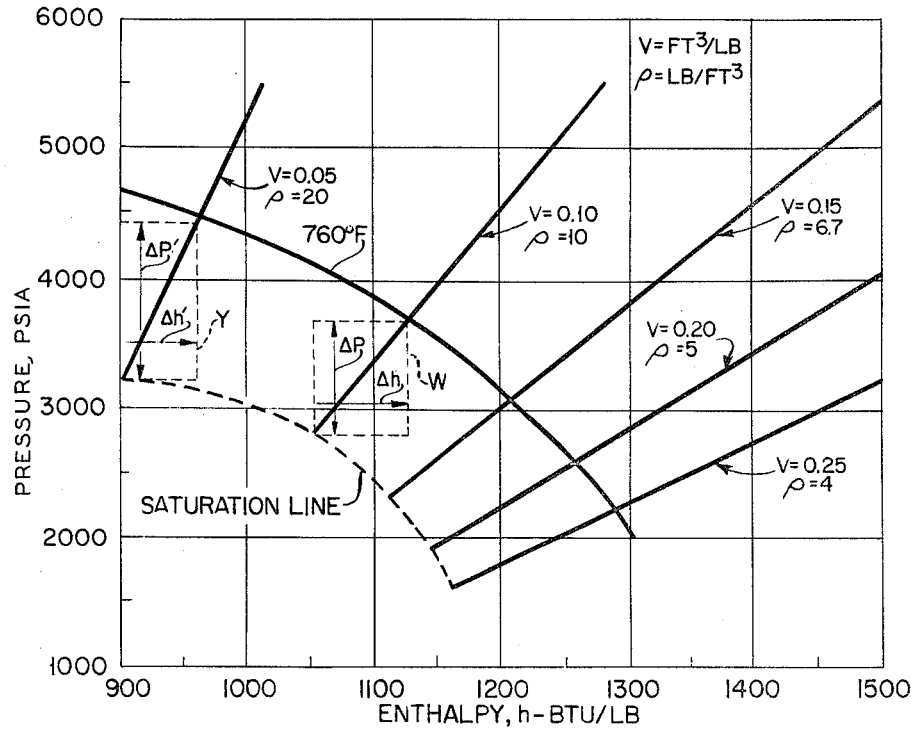
Figure 4:
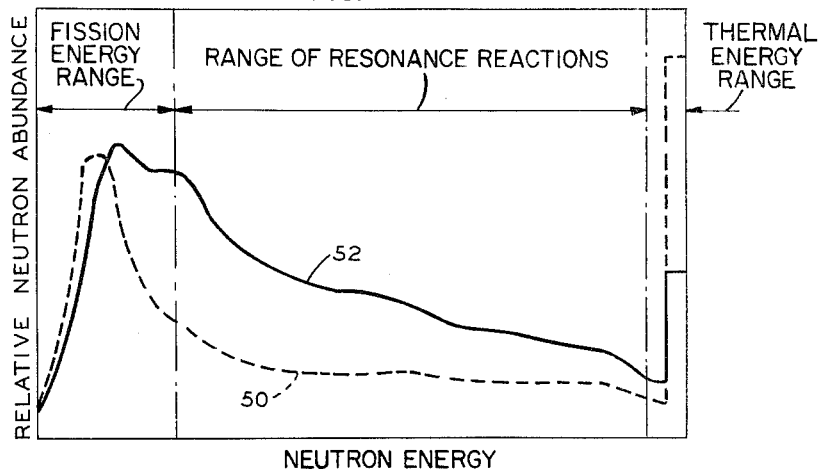

Of the drawings:
FIG. 1 is a schematic illustration of the reactor system of the present invention;
FIG. 2 is a vertical section of the reactor of the present invention;
FIG. 3 is a graphical representation of steam density corresponding to various pressures and enthalpies; and
FIG. 4 is a graphical representation of neutron abundance vs. neutron energy.

A schematic illustration of a reactor system of the present invention is presented in FIG. 1 wherein the nuclear reactor 10 is provided with a suitable pressure retaining vessel 12, shown here partly in section as an elongated cylindrical pressure vessel having suitable bottom and top end closure members 14 and 16, respectively, one of which may be removably attached thereto as at flanged joint 18. The interior of the reactor pressure vessel 12 is divided into two spaces, a coolant space and a moderating space. One method of so dividing the interior of the pressure vessel is shown in the drawing and consists of upper and lower tube sheets, 20 and 22, respectively, extending across and integrally attached to the upper and lower portions of the pressure vessel and having a plurality of tubes 24 extending therebetween and secured thereto. The coolant space is thus that space within the tubes and also the end portions of the pressure vessel outside the tube sheets 20 and 22. The moderating space 25 is that space enclosed between the two tube sheets exclusive of the space occupied by the tubes 24.

Fissionable material-bearing fuel elements (not shown), of a type well known in the art, are arranged within the tubes 24 as a core with a critical mass to undergo a self-sustaining fission-type chain reaction when moderated, as will be further described hereinbelow. In addition to the fissionable material-bearing fuel elements it is desirable that fertile material-bearing elements be also incorporated in the reactor core in a manner well known in the art. In this way the optimum in neutron utilization and economy may be obtained as will also be further discussed hereinbelow.

The coolant space is provided with inlet and outlet lines, 26 and 28, respectively, so that primary coolant fluid may be circulated, as by a pump 30, through the tubes 24 in heat transfer relation with the fuel elements therein to remove the heat generated by the fission-type chain reaction. The heated primary fluid leaves the reactor pressure vessel 12 via the outlet line 28 and passes through a heat exchanger 32, giving up heat to a secondary heat transfer fluid in indirect heat transfer relation, the latter fluid being transported to a point of use, not shown. The cooled primary fluid, upon leaving the heat exchanger 32, is returned to the reactor 10 by the pump 30 via inlet line 26.

The moderating space is supplied with a moderating fluid via inlet and outlet lines 34 and 36, respectively, and may be circulated by a pump 38 in the inlet line. A heat exchanger 40 may be positioned in the moderating fluid circulating circuit, or loop, to remove heat absorbed by the moderator fluid in its passage through the moderating space of the reactor core and thus by proper regulation maintain the moderating fluid temperature and pressure substantially constant in this closed loop for a given power output. A moderator supply line 42, provided with a metering device 44, opens into the line between heat exchanger 40 and the inlet of pump 38, thence into the inlet line 34 of the moderator circulating loop. An exhaust line 46 having a metering device 48 in communication with the outlet line 36 is also provided in the moderator loop.

The metering devices 44 and 48 may be of any type well known in the art and may include metering valves or positive displacement pumps, the primary requirement of such metering devices being that they must be capable of introducing or withdrawing accurate, predetermined amounts of moderating fluid into or out of the moderator circuit, as required, to permit controllable variation of the concentration of moderating fluid within the moderating space 25 of the reactor.

Almost any heat transfer fluid may be used as a primary coolant fluid, including steam or other gas, pressurized light or heavy water, organic fluids, liquid metals, or molten salts. While many of these primary coolant liquids may provide some degree of neutron moderation, it is preferable to rely, for moderation, on the moderating fluid, and the core of the reactor should be arranged accordingly, as is well known in the art. The moderating fluid may be any single phase hydrogen-isotope-bearing fluid capable of a substantial change in density with a change in enthalpy and may include water at or near, or even above the critical pressure and temperature, or superheated steam at these pressures, vaporous hydrocarbons, or free hydrogen or mixtures of these with inert gases. Such a hydrogen-isotope containing fluid, would, of course, include both hydrogen and deuterium bearing compositions.

It is known that in a nuclear reactor when fuel material undergoes fissioning, neutrons having a wide range of energy are generated. As shown in FIG. 4, there is a comparatively wide variation in relative neutron abundance with respect to neutron energy. The neutrons created by the fissioning of an atom are at a comparatively high energy level. As they move outwardly from the atom being fissioned, they are moderated or slowed by the various materials within the reactor, including both structural and moderating material. As these neutrons are slowed they pass through the resonance reaction energy range wherein fertile material may capture the neutrons and thus create fissionable material from the fertile material. Further down the neutron energy range, i.e. following the resonance reaction range, there is the thermal energy range wherein most fissionable material reacts with the neutrons there present to undergo a fisson reaction. It has been found that the relative abundance of neutrons within the range of resonance reactions and within the thermal energy range may be altered by varying the amount of moderation to which the neutrons are subjected. Thus, if the neutrons are subjected to a comparatively high amount of moderation the relative abundance of neutrons within the various energy ranges will approximate that shown by line trace 50 in FIG. 4. According to this, it will be seen that the neutron abundance within the thermal range is relatively high while that within the resonance reaction range is relatively low. Conversely, should the amount of moderation be relatively low, the range of abundance of neutrons within the various energy ranges will approximate that indicated by line trace 52 in FIG. 4, wherein it may be seen that the abundance of neutrons in the thermal energy range is relatively lower than in the former case while the neutron abundance in the resonance reaction range is significantly higher. In a reactor during initial operation the amount of fuel materal contained in the core is relatively high while the amount of neutron poisons is relatively low, thus it may operate with less neutron moderation since less neutrons are required in the thermal energy range to sustain the fission-type chain reaction than will be necessary later in the core life span since, when the amount of fuel has substantially decreased there will be a corresponding rise in fission product neutron poisons within the core. So it may be seen that where moderation is reduced, as indicated by line 52, the amount of neutrons available within the resonance reaction range is greater, making available more neutrons for reacting with the fertile material within the core to generate more fissonable fuel. Conversely, greater neutron moderation is required as the reactor ages and more neutrons are needed to sustain the fission-type chain reaction and the relative amount of neutrons available for reacting with the fertile material is less, as indicated by line 50. Thus, it will be seen that the neutron utlization is enhanced by varying the amount of neutron moderation consonant with the age of the reactor core. This becomes significantly apparent when it is realized that, if such fertile material were not productively utilized in the reactor core, the amount of neutrons available in the thermal energy range would be varied by changing the amount of neutrons permitted to be absorbed non-productively in the core or which could escape from the reactor core. Accordingly, it is seen that operating economies may be realized by controlled utilization of those neutrons not needed for sustaining the chain reaction by reacting them with fertile material to generate new nuclear fuel rather than by just permitting them to be dissipated within the reactor.

It has been found that a reactor of the present invention may be operated and its output controlled by the introduction of steam of the order of 700° F. and 3000 p.s.i. into the moderating space. Steam under these conditions will have a sufficient concentration of hydrogen atoms to provide the necessary neutron moderation as discussed above. Furthermore, by varying the density of the steam within the moderating space provided in the reactor core, the reactivity of the reactor may be controllably varied. This is accomplished by varying the inventory of steam in the moderating loop by means of metering devices 44 and 48. Thus, as the power level of the system is increased, more steam is introduced into the moderating loop. As the power level is reduced, steam is removed from the loop. Should it be desired to variably moderate the chain reaction over the life of the fuel material, it is possible to dilute $H_2O$ steam with $D_2O$ steam. Since $D_2O$ has a significantly different moderating power in comparison with $H_2O$, its use is very desirable since the chemical properties are nearly identical to $H_2O$ and no material incompatibility problems are encountered. Should the desired operating pressure of the coolant fluid within the tubes 24 be considerably above the pressure necessary to obtain the required moderator vapor density, and it is deemed advantageous to reduce the stresses imposed upon the tubes by the pressure differential thereacross, a non-moderating vapor or gas such as helium or nitrogen may be introduced into the moderator loop to provide the necessary partial pressure to raise the total pressure in the moderator loop and decrease the total pressure differential across the tube wall.

In nearly all the reactors of the prior art it has been necessary to utilize control rods for controlling excess reactivity and adjusting the power level of the reactor and for the purpose of terminating the chain reaction to shut the reactor down. As noted above, the use of control rods as a method for controlling a nuclear reactor has certain drawbacks, among them being flux peaking caused by the absorption of the neutrons by the control rod material. It will be seen that if flux peaking were minimized or eliminated the average power level and/or coolant outlet temperature of the core could be raised to a point much nearer the maximum permissible values, thus increasing the power output for a given size reactor. Additional limitations imposed by the use of control rods result from the complex mechanism that are subjected to and must be operated in the presence of high temperature reactor coolants and which, in many cases, render the associated apparatus difficult to properly service and maintain.

The variable control of the control rods is replaced in the present reactor by the variation of the hydrogen-isotope concentration in the moderating space as described above. The shut-down operation, with this type of control, is accomplished by a relief valve 49 in the exhaust line 46. This valve may be either automatic or selectively operable as conditions dictate so that upon the recepton of a "scram" signal from the reactor control system, in the case of a selectively operated valve, or the increase of the moderator vapor pressure above a predetermined set point, in the case of a pressure relief valve, the valve would open, venting the moderator circuit to a lower pressure receiver (not shown). The resultant reduction in pressure within the moderator space causes the concentration of hydrogen atoms and the corresponding degree of moderation to fall below the amount necessary to sustain the fission-type chain reaction thereby shutting down the reactor.

The specific arrangement of the reactor of the present invention is illustrated in FIG. 2 wherein the reactor 10 comprises a pressure vessel which consists of an elongated cylindrical shell 66 closed at the lower end by a hemispherical head 68 having an outlet nozzle 70 integrally attached therethrough. The cylindrical shell 66 terminates at the upper end in a closure flange 72. An upper closure head 74 having a closure flange 76 is adapted to mate with closure flange 72 to close the upper end of the pressure vessel. The mating flanges 72 and 76 are connected by a plurality of circumferentially spaced studs 78. An inlet nozzle 80 is disposed in the upper portion of the closure head 74 and is connected to inlet line 26 of the reactor system (in FIG. 1). The cylindrical shell 66 of the pressure vessel may be provided with a plurality of external bands or laminations generally indicated as at 82 in order to more economically accommodate the comparatively high internal pressure, as is well known in the art.

Suspended from a circumferential groove 84 in the inner surface of flange 72 is a cylindrical member 86 which is closed at its lower end by a horizontal tube sheet 88. This cylindrical member 86 and the tube sheet 88 cooperate with the inner surface of the closure head 74 to form an inlet plenum chamber 90. A seal 92 is provided at the joint between the upper end of the cylindrical member 86 and the flanges 72 and 76 to prevent leakage of fluid into and from the plenum chamber.

An outlet plenum chamber 94 is formed in the lower portion of the pressure vessel by a hemispherically shaped member 96 closed at its upper end by a tube sheet 98. The hemispherical member 96 has a centrally disposed nozzle 100 in its lowermost portion to which is attached an outlet line 102. A plurality of tubes 104 are securely attached to the upper tube sheet 88 and the lower tube sheet to provide a flow path between the inlet plenum 90 and the outlet plenum 94. Accordingly, the inlet plenum 90, the space or flow area within the tubes 104, and the outlet plenum 94 form the second, coolant, section of the pressure vessel, as described above, for the passage of a coolant therethrough. The remaining space within the pressure vessel, i.e., outside the tubes 104 forms the first, or moderator, section of the pressure vessel wherein the moderating fluid is disposed.

The outlet line 102 is formed of a plurality of concentric tubular members connected, alternately, at their upper and lower ends to adjacent members forming an expansion compensator. The outlet line terminates in a nozzle member 106 which is connected to outlet line 28 of the reactor system (in FIG. 1). The nozzle member 106 has an outwardly extending flange portion 108 which mates with an inwardly extending flange portion 110 provided at the end of outlet nozzle 70. The two flange portions, 108 and 110, are maintained in abutting relationship by a ring member 112 secured by bolts to the outer end of nozzle 70, the ring member seating in a groove formed in the outer surface of nozzle member 106.

The expansion compensator is formed by the alternate tubular members of the outlet line 102 which are formed of materials having differing coefficients of thermal expansion. These alternate tubular members are chosen so as to accommodate the differential motion between the pressure vessel and the reactor internals. This is necessary to provide for differential expansion of the several components. It should be noted that the internal assembly formed by the cylindrical member 86, the tubes 104, and the hemispherical member 96 is rigidly attached to the pressure vessel both at the top and the bottom, and due to the different materials of construction and the different operating temperatures of the assembly and the pressure vessel, such differential expansion compensation is necessary.

A plurality of fissionable material-bearing fuel elements 114 are suspended in tubes 104, supported from tube sheet 88. Each fuel element is arranged to provide an annular flow space between it and its associated tube to permit the passage of a coolant fluid therethrough and thus to remove the heat generated by the fission-type chain reaction.

Arranged about the exterior of the reactor core, which is formed by the fuel elements 114 within the tubes 104, is a layer of neutron reflecting material 116, such as graphite, to reflect neutrons, escaping from the periphery of the core, back into the core in a manner well known in the art. A layer of thermal shielding 118 is arranged between the cylindrical outer surface of the reflecting material and the inner surface of the pressure vessel 66 to protect the pressure vessel from the heating and damaging effects of radiation produced by the reactor core, also as is well known in the art. Additional thermal shielding material 120 is disposed adjacent the inner surfaces of tube sheets 88 and 98 to protect them in a similar manner from the heating and damaging effects of radiation. The annular portions of the neutron reflector 116 and the annular thermal shielding material 118 are supported by an annular support 122 in the lower portion of the pressure vessel. The thermal shielding 120 and neutron reflector 116 associated with the tube sheets are aligned and supported thereby and are inserted and removed from the reactor pressure vessel with the inlet and outlet plenum assembly.

Moderating fluid inlet nozzles 124, which connect to inlet line 34 (FIG. 1), are provided through outlet nozzle 70 for introduction of the moderating fluid into the annular space formed by the nozzle 70 and outlet line 102, which then flows upwardly around the exterior of the outlet line 102 and the exterior of the hemispherical member 96, thence to the upper surface of lower tube sheet 98. Channels (not shown) are provided through the thermal shielding 120 and the horizontal layer of reflector material 116 to permit the moderating fluid to flow upwardly, around the tubes 104 of the reactor core. These tubes may be provided with thermal insulation material to minimize the transfer of heat from the coolant fluid therein to the moderator fluid. In this way, the major portion of heat generated by the chain reaction will be removed by the coolant fluid rather than the moderator fluid. This simplifies the maintenance of the density of the moderator fluid within the desired limits for the control of the chain reaction. The moderating fluid then passes through channels (not shown) in the upper portion of the neutron reflector 116 and thermal shielding 120 to the under side of the upper tube sheet 88, flowing up along the outer surface of cylindrical member 86 and then down along the inner surface of the pressure vessel 66 to outlet nozzles 126 in the lower pressure vessel head 68. These outlet nozzles connect with outlet line 36 (in FIG. 1) to complete the moderator circuit. Coolant flow passages (not shown) are also provided in the annular portion of the neutron reflector material 116 and the thermal shielding 118 to facilitate the flow of a portion of the moderating fluid for maintaining these components within the desired temperature limits. Suitably sized moderator outlet lines 128 are also provided in the lower extremity of outlet nozzle 70 for the flow of moderator fluid through the annular space in the lower portion of the nozzle to maintain its temperature within desired limits.

A plurality of tubes 130 are distributed around the periphery of the core and extend from the upper tube sheet 88 to the opening of nozzle 100 in the outlet plenum chamber 94. These tubes do not contain fuel elements, nor are they provided with thermal insulation, their purpose being to supply cooling fluid, virtually unheated in its passage through the core area, to the expansion compensator in the outlet line 102. In this way, the temperature of the expansion compensator may be controlled to satisfactorily accommodate the differential thermal expansion between the reactor vessel and the internal components.

In initiating operation, the reactor and the associated moderator and coolant circuits are first brought to equilibrium operating temperature by imparting heat, supplied from a suitable external heat source, not shown, to both the moderator and coolant fluids, and circulating the fluids through the appropriate circuits by pumps 38 and 30, respectively. When the reactor has reached its operating temperature, additional moderator vapor is introduced into the moderator circuit through the inlet metering device 44 by way of inlet line 42, thereby increasing the density of the vapor within the moderator portion of the reactor core and bringing the system to the desired operating pressure. The resultant increase in the neutron moderation proceeds to the point where reactor criticality is reached, while at the same time coolant fluid is admitted to the coolant circuit in appropriate amounts to maintain the desired fluid pressure differential between the moderator and coolant circuits and a self-sustaining fission-type chain reaction is thus initiated. At this point, the external heat source is no longer required. Since this reactor system is purposely designed to incorporate positive density and negative power reactivity coefficients, reactor power may be readily increased by introducing a quantity of moderating fluid into the moderator circuit. At the same time, flow through the coolant circuit is increased to maintain the desired reactor coolant outlet temperature. This process is continued until the desired coolant flow and outlet temperature is reached. If the system pressures should become excessive during this process, the hydrogen content of the moderating fluid may be appropriately increased, reducing the moderator fluid pressure required. The heat exchanger 32 in the primary coolant loop will then begin to extract heat produced within and conveyed from the reactor by the primary coolant for conversion to useful work.

In this system the moderator circuit or loop is conceived as simulating a sphere of constant volume. The variation of temperature or enthalpy of the steam circulated in the loop is held to a low value; similarly, the pressure drop in the loop is kept low so the absolute pressure in any part of the loop is maintained substantially constant. Thus, if there is a thermal unbalance between the heat added to the moderator in the reactor and the heat taken away from the moderator in the heat exchanger, the system pressure will rise or fall, but the quantity and density of the steam in the loop will remain constant. Heating or cooling of the sphere and its contents will vary the pressure and temperature but not the density of the steam therein. It should be understood, however, that the mass of moderating vapor within the moderating loop may be varied over the life of the reactor core as dictated by the power output and the amount of moderation required.

Referring to FIG. 3, it may be seen that for a reactor requiring a density of moderating steam of approximately 10 pounds per cubic foot and operating at a temperature between saturation and 760° F., the moderator loop may be operated over a range of pressures, $\Delta P$ from about 2900 p.s.i.a. to 3700 p.s.i.a. if the enthalpy is maintained within a corresponding range of $\Delta h$ from about 1050 B.t.u./lb. to 1125 B.t.u./lb. as indicated by reference letter W. As the core of the reactor ages, with an increase in moderation required, the mass of the moderating vapor in the loop is increased so that the density of the vapor at the end of the core life will be approximately 20 pounds per cubic foot. At that time, the moderating vapor, while being maintained within the same temperature range as before will now be operated over a range of pressure, $\Delta P'$, of 3200 p.s.i.a. to 4450 p.s.i.a. and a range of enthalpies, $\Delta h'$ of 900 B.t.u./lb. to 960 B.t.u./lb. as indicated by reference letter Y. While these values have been given as an example, it will be appreciated that the density of steam required will be dictated by the particular design of the reactor. However, it should be noted that the permissible upper temperature limit of the moderator vapor in the moderator will be limited by the use limit of the structural material of the reactor, which in this example is stated as being approximately 760° F. The lower limit may be determined by the operating pressure of the coolant loop since, as already stated, for safety reasons it is desirable to maintain the moderator loop at a pressure above that of the coolant loop.

In the reactor system as here described, utilizing steam both as the coolant and as the moderating vapor, the reactor will be designed to have a negative coefficient of reactivity as a result of enthalpy changes of the coolant fluid. Accordingly, small changes in the reactivity of the reactor core will be overpowered, resulting in inherently safe operation especially in combination with a negative power coefficient, with the reactor self-regulating in adjusting itself to the output demand of the system. Thus, as the output demand increases, the coolant fluid temperature entering the reactor core will be reduced, thereby increasing its density and moderating effect with a resulting increase in reactor power output. Conversely, should the output demand of the system decrease, the coolant fluid temperature returning to the reactor will be raised, decreasing its density and its moderating effect and reducing the power output to the point where equilibrium is again restored at the lower power output.

To illustrate the preferred embodiment of the invention, the below Table I gives details of the reactor described above:

TABLE I

| | |
|---|---|
| Reactor output | 750 mw. heat. |
| Net plant output | 315 mw. elec. |
| Plant thermal efficiency (net) | 42%. |
| U-235 loading | 1015 kg. |
| U-238 loading | 21,545 kg. |
| Fuel enrichment | 4.5%. |
| Average heat flux | 255,000 B.t.u./hr.-ft.$^2$. |
| Peak heat flux | 418,000 B.t.u./hr.-ft.$^2$. |
| Peak to average power ratio | 1.64. |
| Max. fuel clad surface temp. | 1109° F. |
| Fuel clad surface temp. at max. heat flux | 1010° F. |
| Number of fuel pins | 5800. |
| Length of fuel pins (active) | 12 ft. |
| Fuel clad material | 19-9DL (stainless alloy). |
| Specific power output | 310 kwe./kg. U-235. |
| Core life | 675 days. |
| Average fuel burnup | 19,500 mwd./ton. |
| Coolant fluid, steam: | |
| Flow | 7,071,500 lb./hr. |
| Pressure | 2950 p.s.i. |
| Inlet temp. | 710° F. |
| Outlet temp. | 1000° F. |
| Pressure drop through core | 100 p.s.i. |
| Moderator fluid, steam: | |
| Flow | 6,500,000 lb./hr. |
| Pressure at start of core life | 2160 p.s.i. |
| Avg. temp. at start of core life | 713° F. |
| Steam density at start of core life | 4.4 lb./ft.$^3$. |
| Pressure at end of core life | 3400 p.s.i. |
| Avg. temp. at end of core life | 703° F. |
| Steam density at end of core life | 14 lb./ft.$^3$. |

In this reactor, based on the above data, the active core would approximate a right circular cylinder having a diameter of about 8 feet and a height of 12 feet. Should it be desirable to incorporate the present invention in a reactor of smaller physical size, this could be accomplished by increasing the $U^{235}$ enrichment of the fuel and/or by increasing the pressure of the steam moderator vapor. Should lower moderation vapor pressures be desirable, a core containing fuel of somewhat lower enrichment and having a larger size could be used, or a core comparable in size but having a higher enrichment of $U^{235}$ could be operated at lower moderation vapor pressures.

While in accordance with the provisions of the statutes the best forms and modes of operation of the invention have been illustrated as now known, those skilled in the art will understand that changes may be made in the form of the apparatus without departing from the spirit of the invention covered by the claims, and that certain features of the invention may sometimes be used to advantage without a corresponding use of the other features.

What is claimed is:

1. A nuclear reactor comprising a vertically elongated cylindrical pressure vessel having an open upper end, a removable closure head registering with and arranged to close said opening, the lower end of said pressure vessel having a head having a nozzle formed therethrough, a support cylinder suspended from said open upper end of said pressure vessel and supporting at its lower extremity an upper tube sheet, said upper tube sheet cooperating with said support cylinder and said closure head to form an inlet plenum chamber, an outlet plenum chamber including a second tube sheet disposed in the lower portion of said pressure vessel in communication with and supported by said nozzle, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for introducing a coolant fluid into said upper plenum chamber for passage downwardly through said tubes in heat transfer contact with said fuel elements therein to remove the heat generated by said chain reaction, and means for introducing single phase steam into said pressure vessel for passage therethrough about the exterior of said tubes to moderate said chain reaction.

2. A nuclear reactor comprising a vertically elongated cylindrical pressure vessel having an open upper end, a removable closure head registering with and arranged to close said opening, a coolant inlet nozzle through said closure head, the lower end of said pressure vessel having a head having a coolant outlet nozzle formed therethrough, a support cylinder suspended from said open upper end of said pressure vessel and supporting at its lower extremity an upper tube sheet, said upper tube sheet cooperating with said support cylinder and said closure head to form an inlet plenum chamber, an outlet plenum chamber including a second tube sheet disposed in the lower portion of said pressure vessel in communication with and supported by said outlet nozzle, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for passing a coolant fluid through said inlet nozzle into said upper plenum chamber for passage downwardly through said tubes in heat transfer contact with said fuel elements therein to remove the heat generated by said chain reaction thence through said outlet plenum and said outlet nozzle, and means for introducing single phase steam into said pressure vessel for passage therethrough about the exterior of said tubes to moderate said chain reaction.

3. A nuclear reactor comprising a vertically elongated cylindrical pressure vessel having an open upper end, a removable closure head registering with and arranged to close said opening, the lower end of said pressure vessel having a head having a nozzle formed therethrough, a support cylinder suspended from said open upper end of said pressure vessel and supporting at its lower extremity an upper tube sheet, said upper tube sheet cooperating with said support cylinder and said closure head to form an inlet plenum chamber, an outlet plenum chamber including a second tube sheet disposed in the lower portion of said pressure vessel in communication with and supported by said outlet nozzle, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for introducing a coolant fluid into said upper plenum chamber for passage downwardly through said tubes in heat transfer contact with said fuel elements therein to remove the heat generated by said chain reaction, a baffle means disposed between said multiplicity of tubes and said cylindrical pressure vessel and extending from said lower end of said pressure vessel to said upper tube sheet, and inlet means for introducing single phase steam into said pressure vessel within said baffle for passage therethrough about the exterior of said tubes to moderate said chain reaction and thence between said pressure vessel and said baffle.

4. A nuclear reactor comprising a vertically elongated cylindrical pressure vessel having an open upper end, a removable closure head registering with and arranged to close said opening, a coolant inlet nozzle through said closure head, the lower end of said pressure vessel having a head having a nozzle formed therethrough, an upper tube sheet, said upper tube sheet cooperating with said closure head to form an inlet plenum chamber, an outlet plenum chamber including a second tube sheet disposed in the lower portion of said pressure vessel, a coolant outlet nozzle extending from said outlet plenum chamber through said nozzle in said lower head, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for passing a coolant fluid through said inlet nozzle into said upper plenum chamber for passage downwardly through said tubes in heat transfer contact with said fuel elements therein to remove the heat generated by said chain reaction thence through said outlet plenum chamber and said coolant outlet nozzle, a baffle means disposed between said multiplicity of tubes and said cylindrical pressure vessel and extending from said lower head to close proximity to said upper tube sheet, moderator inlet means extending through said lower head, means for introducing single phase moderator steam into said pressure vessel through said moderator inlet means for passage upwardly within said baffle exterior of said tubes to moderate said chain reaction and then downwardly exterior of said baffle, and a moderator vapor outlet extending through said lower head of said pressure vessel and opening therein on the opposite side of said baffle from said moderator inlet means.

5. A nuclear reactor comprising a vertically elongated cylindrical pressure vessel having an open upper end, a dish-shaped removable closure head registering with and arranged to close said opening, a coolant inlet nozzle through said closure head, the lower end of said pressure vessel having a dish-shaped head having a nozzle formed therethrough, a support cylinder suspended from said open upper end of said pressure vessel and supporting at its lower extremity an upper tube sheet, said upper tube sheet cooperating with said support cylinder and said closure head to form an inlet plenum chamber, an outlet plenum chamber including a dish-shaped portion terminating in a second tube sheet disposed in the lower portion of said pressure vessel, a coolant outlet nozzle extending from said outlet plenum chamber coaxially through said nozzle in said lower head, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for passing a coolant fluid through said inlet nozzle into said upper plenum chamber for passage downwardly through said tubes in heat transfer contact with said fuel elements therein to remove the heat generated by said chain reaction thence through said outlet plenum chamber and said coolant outlet nozzle, a baffle means disposed between said multiplicity of tubes and said cylindrical pressure vessel and extending from said lower dish-shaped head to close proximity with said upper tube sheet support cylinder, means including a closed circuit for passing $H_2O$ and $D_2O$ containing single phase steam into said reactor exterior of said tubes to moderate said chain reaction, means for regulating the proportion of $H_2O$ and $D_2O$ in said steam, and means for regulating the density of said steam within said reactor to control said chain reaction.

6. A nuclear reactor comprising a vertically elongated cylindrical pressure vessel having an open upper end, a dish-shaped removable closure head registering with and arranged to close said opening, a coolant inlet nozzle through said closure head, the lower end of said pressure vessel having a dish-shaped head having a nozzle formed therethrough, a support cylinder suspended from said open upper end of said pressure vessel and supporting at its lower extremity an upper tube sheet, said upper tube sheet cooperating with said support cylinder and said closure head to form an inlet plenum chamber, an outlet plenum chamber including a dish-shaped portion terminating in a second tube sheet disposed in the lower portion of said pressure vessel, a coolant outlet nozzle extending from said outlet plenum chamber coaxially through said nozzle in said lower head, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for passing a coolant fluid through said inlet nozzle into said upper plenum chamber for passage downwardly through said tubes in heat transfer contact with said fuel elements therein to remove the heat generated by said chain reaction thence through said outlet plenum chamber and said coolant outlet nozzle, a baffle means disposed between said multiplicity of tubes and said cylindrical pressure vessel and extending from said lower dish-shaped head to close proximity to said upper tube sheet support cylinder, moderator inlet means through said nozzle in said lower head for the introduction of a moderator fluid into said reactor, a moderator outlet means extending through said lower head of said pressure vessel and opening therein on the opposite side of said baffle from said moderator inlet means, means including a closed circuit for passing $H_2O$ and $D_2O$ containing single phase steam through said moderator inlet upwardly around said tubes to moderate said chain reaction and then downwardly exterior of said baffle to said moderator outlet means, means for regulating the proportion of $H_2O$ and $D_2O$ in said steam, and means for regulating the density of said steam within said reactor to control said chain reaction.

7. A nuclear reactor comprising a vertically elongated cylindrical pressure vessel having an open upper end, a dish-shaped removable closure head registering with and arranged to close said opening, a coolant inlet nozzle through said closure head, the lower end of said pressure vessel having a dish-shaped head having a nozzle formed therethrough, a support cylinder suspended from said open upper end of said pressure vessel and supporting at its lower extremity an upper tube sheet, said upper tube sheet cooperating with said support cylinder and said closure head to form an inlet plenum chamber, an outlet plenum chamber including a dish-shaped portion terminating in a second tube sheet disposed in the lower portion of said pressure vessel, a coolant outlet nozzle extending from said outlet plenum chamber coaxially through said nozzle in said lower head, a multiplicity of tubes extending between and connected through said upper and lower tube sheets, a multiplicity of fissionable material-bearing fuel elements supported from said upper tube sheet within said tubes and arranged as a core to undergo a self-sustaining fission-type chain reaction, means for passing a coolant fluid through said inlet nozzle into said upper plenum chamber for passage downwardly through said tubes in heat transfer contact with said fuel elements therein to remove the heat generated by said chain reaction thence through said outlet plenum chamber and said coolant outlet nozzle, a baffle means disposed between said multiplicity of tubes and said cylindrical pressure vessel and extending from said lower dish-shaped head to close proximity to said upper tube sheet support cylinder, moderator inlet mans through said nozzle in said lower head for the introduction of a moderator fluid into said reactor, a moderator outlet means extending through said lower head of said pressure vessel and opening therein on the opposite side of said baffle from said moderator inlet means, means including a closed circuit for passing H$_2$O and D$_2$O containing supercritical steam through said moderator inlet upwardly around said tubes to moderate said chain reaction and then downwardly exterior of said baffle to said moderator outlet means, means for regulating the proportion of H$_2$O and D$_2$O in said stream, means for regulating the density of said supercritical steam within said reactor to control said chain reaction, and valve means in said closed circuit operable to relieve the pressure therein sufficiently to reduce the density of said steam in said reactor to terminate said chain reaction.

References Cited by the Examiner

UNITED STATES PATENTS

| | | | |
|---|---|---|---|
| 2,848,404 | 8/1958 | Treshow | 176—64 |
| 2,868,708 | 1/1959 | Vernon | 176—52 |
| 2,915,446 | 12/1959 | Liljeblad | 176—58 |
| 2,977,297 | 3/1961 | Evans et al. | 176—52 |
| 3,081,246 | 3/1963 | Edlund | 176—42 |
| 3,085,964 | 4/1963 | Ritz et al. | 176—60 |
| 3,099,616 | 7/1963 | Bauer et al. | 176—60 |

FOREIGN PATENTS

| | | |
|---|---|---|
| 131,782 | 5/1940 | Australia. |
| 749,064 | 5/1956 | Great Britain. |

OTHER REFERENCES

Schultz: Control of Nuclear Reactors and Power Plants, 2nd edition, published by McGraw-Hill, 1961, pages 251 and 252.

CARL D. QUARFORTH, *Primary Examiner*.

REUBEN EPSTEIN, *Examiner*.